(12) United States Patent
Paukner et al.

(10) Patent No.: US 11,377,992 B2
(45) Date of Patent: Jul. 5, 2022

(54) METHOD FOR REGENERATING A PARTICLE FILTER

(71) Applicant: VOLKSWAGEN AKTIENGESELLSCHAFT, Wolfsburg (DE)

(72) Inventors: Stefan Paukner, Wolfsburg (DE); Falk-Christian Baron Von Ceumern-Lindenstjerna, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 163 days.

(21) Appl. No.: 16/474,827

(22) PCT Filed: Jan. 10, 2018

(86) PCT No.: PCT/EP2018/050509
§ 371 (c)(1),
(2) Date: Jun. 28, 2019

(87) PCT Pub. No.: WO2018/130541
PCT Pub. Date: Jul. 19, 2018

(65) Prior Publication Data
US 2019/0353066 A1 Nov. 21, 2019

(30) Foreign Application Priority Data
Jan. 12, 2017 (DE) ...................... 10 2017 100 500.5

(51) Int. Cl.
*F01N 3/00* (2006.01)
*F01N 3/023* (2006.01)
(Continued)

(52) U.S. Cl.
CPC ............. *F01N 3/023* (2013.01); *B01D 46/84* (2022.01); *F01N 11/005* (2013.01);
(Continued)

(58) Field of Classification Search
CPC .... F01N 3/023; F01N 11/005; F01N 2550/04; F01N 2560/06; F01N 2900/1606; B01D 46/0063; B01D 2201/08; B01D 2258/01
See application file for complete search history.

(56) References Cited

U.S. PATENT DOCUMENTS

| 5,672,324 A * | 9/1997 | Okamoto ............. F01N 3/2026 422/174 |
| 2005/0198944 A1* | 9/2005 | Saitoh ..................... F01N 3/023 60/295 |

(Continued)

FOREIGN PATENT DOCUMENTS

| CN | 103867262 | 6/2014 |
| DE | 199 45 372 A1 | 3/2001 |

(Continued)

OTHER PUBLICATIONS

Search report for German Patent Application No. 10 2017 100 500.5, dated Aug. 30, 2017.
(Continued)

*Primary Examiner* — Matthew T Largi
(74) *Attorney, Agent, or Firm* — Pearl Cohen Zedek Latzer Baratz LLP

(57) ABSTRACT

The invention relates to a method for regenerating a particulate filter in the exhaust gas channel of an internal combustion engine. Here, the particulate filter is divided into several zones for determining the loading state, and, at the same time, a temperature distribution over the cross section of the particulate filter is determined. In order to prevent the soot retained in the edge zones of in the particulate filter
(Continued)

from being insufficiently oxidized, when it is ascertained that the edge zones have been sufficiently loaded, the exhaust gas temperature is raised to a temperature which, in spite of the heat losses in the edge areas, lies above the temperature at which oxidation of the soot particles can take place. The invention further relates to an internal combustion engine having an exhaust gas channel and a particulate filter arranged in the exhaust gas channel, said internal combustion engine being configured to carry out such a method.

9 Claims, 2 Drawing Sheets

(51) Int. Cl.
  *F01N 11/00* (2006.01)
  *B01D 46/84* (2022.01)
(52) U.S. Cl.
  CPC ...... *B01D 2201/08* (2013.01); *B01D 2258/01* (2013.01); *F01N 2550/04* (2013.01); *F01N 2560/06* (2013.01); *F01N 2900/1606* (2013.01)

(56) References Cited

U.S. PATENT DOCUMENTS

| | | | |
|---|---|---|---|
| 2006/0016179 A1 | 1/2006 | Okugawa et al. | |
| 2009/0071127 A1* | 3/2009 | Gonze | F01N 3/035 60/286 |
| 2009/0071128 A1* | 3/2009 | Gonze | F01N 13/009 60/286 |
| 2010/0102828 A1* | 4/2010 | Bromberg | B01D 46/0086 324/639 |
| 2010/0205943 A1* | 8/2010 | Gonze | F01N 3/0256 60/286 |
| 2010/0319315 A1* | 12/2010 | Gonze | F01N 13/009 60/273 |
| 2011/0004391 A1 | 1/2011 | Gonze | |
| 2011/0252769 A1* | 10/2011 | Crosbie | F01N 11/002 60/274 |
| 2011/0258985 A1* | 10/2011 | Gonze | F01N 3/027 60/274 |
| 2014/0343747 A1* | 11/2014 | Culbertson | F01N 3/2013 700/300 |

FOREIGN PATENT DOCUMENTS

| | | |
|---|---|---|
| DE | 103 49 134 A1 | 5/2005 |
| DE | 10 2005 011 419 A1 | 9/2005 |
| DE | 10 2005 034 115 A1 | 3/2006 |
| DE | 10 2006 028 426 A1 | 12/2007 |
| DE | 10 2008 046 706 A1 | 4/2009 |
| DE | 10 2010 023 711 A1 | 2/2011 |
| DE | 10 2010 019 309 A1 | 11/2011 |
| DE | 10 2011 018 292 A1 | 12/2011 |
| DE | 10 2015 221 495 A1 | 5/2017 |
| WO | WO 93/05388 A1 | 3/1993 |

OTHER PUBLICATIONS

International Search Report of PCT Application No. PCT/EP2018/050509, dated Mar. 2, 2018.

Office Action for Chinese Application No. 201880004979.6, dated Aug. 14, 2020.

* cited by examiner

METHOD FOR REGENERATING A PARTICLE FILTER

CROSS-REFERENCE TO RELATED APPLICATIONS

This application is a National Phase Application of PCT International Application No. PCT/EP2018/050509, International Filing Date Jan. 10, 2018, claiming priority of German Patent Application No. 10 2017 100 500.5, filed Jan. 12, 2017, which is hereby incorporated by reference.

FIELD OF THE INVENTION

The invention relates to a method as well as to a device for regenerating a particulate filter in the exhaust gas channel of an internal combustion engine.

BACKGROUND OF THE INVENTION

Current and future emissions legislation, which will become increasingly stricter, makes high demands with respect to the raw engine emissions and the aftertreatment of exhaust gas of internal combustion engines. With the introduction of the European emission standard Euro 6 for gasoline engines, a limit value is being stipulated for particle emissions so that, in gasoline engines as well, there can be a need to use a particulate filter. While a motor vehicle is being driven, the particulate filter is laden with particles, whereby the counter-pressure in the exhaust gas channel rises as the loading increases. This loading of the particulate filter can be determined, for example, by means of a differential measurement in the exhaust gas channel upstream and downstream from the particulate filter or else by means of modeling in a control unit of the internal combustion engine. In order to prevent the exhaust gas counter-pressure from rising excessively, the particulate filter has to be continuously or periodically regenerated. In order to use oxygen to carry out a thermal oxidation of the soot particles on the particulate filter, a sufficient regeneration temperature as well as the concurrent presence of residual oxygen in the exhaust gas are needed. Owing to the construction of the particulate filter, the temperature is necessarily distributed radially throughout the particulate filter during operation. The temperature decreases towards the edge areas because of the wall heat losses and the slower flow rate. The extent thereof is decisively influenced by the operating point and by the structural design of the funnel and the characteristics of the inflow. The temperature gradient in the edge areas can mean that the temperature prevailing there is no longer sufficient for oxidation of the soot. Thus, there are areas in the particulate filter in which soot continues to collect, whereas other areas of the particulate filter are regenerated. This leads to problems with the regenerability as well as to an unfavorable counter-pressure behavior of the particulate filter. Moreover, the components of the particulate filter can be damaged in case of an uncontrolled regeneration.

German patent application DE 199 45 372 A1 discloses a method for controlling the regeneration of a particulate filter in which a characteristic map or a model are used to carry out the regeneration of the particulate filter. The model involves a loading value of the particulate filter, said model including the driving time and the driving distance since the last regeneration. On the basis of the loading value, a state characteristic value is determined and a regeneration is carried out if this value is exceeded.

Even though these methods method already take several characteristic values into account, they still assume a uniform temperature distribution over the particulate filter as well as a uniform loading of the particulate filter.

German patent application DE 103 49 134 A1 discloses a method for regenerating a particulate filter in which the distribution of the surface temperature is ascertained by means of a thermography camera and, on the basis of the present temperature distribution, an attempt is made to achieve the most uniform possible temperature distribution over the cross section of the particulate filter by selecting appropriate engine parameters or appropriate inflow characteristics into the particulate filter.

This method, however, is very laborious and cost-intensive, so that it is primarily suited for use on a test bench and not for use in a motor vehicle. Moreover, it can happen that the soot in the exhaust gas dirties the viewing window for the thermography camera so that this influencing factor also has to be compensated for and the measuring period is limited.

German patent application DE 10 2006 028 426 A1 discloses a device for determining the loading state of a particulate filter with particles that were filtered out on the porous walls of the filter body, without the need to make an experimental determination of the arrangement of electrodes in or on the filter body of the particulate filter and without reducing the filter surface area needed for the filtering. Here, the particulate filter that is arranged in the exhaust gas channel of an internal combustion engine and that consists of a housing and a filter body has two electrodes, whereby the first electrode is arranged on the end face of the filter body associated with the exhaust gas inlet and the second electrode is arranged on the end face of the filter body associated with the exhaust gas outlet, and the electrodes are configured as a closed ring grid, whereby the ring grid has a plurality of openings in a grid-like arrangement.

A drawback of the prior-art methods, however, is that, although such a method allows a relatively precise determination of the local loading of the particulate filter, the regeneration conditions are not necessarily attained in spite of raising the exhaust gas temperature from a temperature that is slightly above the regeneration temperature needed for oxidizing soot particles in the edge areas. This can cause an accumulation of soot in the edge areas and thus an elevated counter-pressure in the exhaust gas channel, thereby leading to greater fuel consumption by the internal combustion engine. Moreover, there is a risk that, when a temperature above the regeneration temperature is reached at a later point in time, this soot accumulation can cause an uncontrolled soot burn-off and thus thermal damage to or destruction of the particulate filter.

SUMMARY OF THE INVENTION

Before this backdrop, the invention is based on the objective of preventing an accumulation of soot in the edge areas of the particulate filter and of ensuring regeneration in all of the areas of the particulate filter.

According to the invention, this objective is achieved by a method for regenerating a particulate filter in the exhaust gas channel of an internal combustion engine, said method comprising the following steps:

determining a loading state of the particulate filter by means of a loading model or by means of sensor system, whereby the particulate filter is divided into at least two zones for purposes of creating the model, whereby a loading state and/or a temperature is/are determined separately for each zone of the particulate filter, whereby if it is detected that there is a need for regenerating at least one of the zones of the particulate filter, the temperature is raised to such an extent that the temperature in all of the zones of the particulate filter is above the regeneration temperature needed for oxidizing the soot that has been retained in the particulate filter.

The method according to the invention prevents a soot accumulation in the appertaining zone of the particulate filter—caused by the fact that the temperature needed for oxidizing the soot that has been retained in the appertaining zone of the particulate filter has not been reached in that the regeneration temperature is raised to such an extent that the temperature needed for oxidizing the soot is reached, even in the very strongly cooled zones of the particulate filter. In this manner, the exhaust gas counter-pressure can be kept low, as a result of which the efficiency of the internal combustion engine is not diminished, which would then lead to greater fuel consumption. Moreover, the risk of an uncontrolled soot burn-off and of a resultant thermal damage to the particulate filter is minimized since, even with unfavorable load situations, for example, prolonged driving in city traffic, followed by highway driving at full load, which is then followed by an overrun phase, the particulate filter does not locally retain such large amounts of soot that a subsequent (uncontrolled) regeneration would then cause thermal damage to the particulate filter.

The features put forward in the dependent claims yield advantageous improvements and refinements of the method for regenerating a particulate filter as put forward in the independent claim.

In a preferred embodiment of the invention, it is provided for the cross section of the particulate filter to be divided into at least two rings in the radial direction. Here, each of these rings forms a zone whose loading state and/or temperature is/are monitored or modeled separately. Since particulate filters generally have a cylindrical cross section and the edge areas—due to the wall heat losses—have a lower temperature than the central areas of the particulate filter, it is practical to divide the particulate filter into at least two rings, whereby each outer ring surrounds an inner ring. The outer ring can also be divided again into several ring segments, especially into two to four ring segments, of 180°, 120° or 90° each, if the wall heat losses are different over the appertaining ring segments, which can be the case, for example, due to splashed water, due to a greater inflow of ambient air or due to adjacent cold or hot components. In this case, the coldest segment of the outer ring is the determining factor when it comes to reaching the regeneration temperature needed for oxidizing the soot particles retained in the particulate filter.

In another preferred embodiment of the invention, it is provided for a loading state to be determined separately for each ring. This determination can be made either by a suitable loading model of the particulate filter, which is preferably stored in the control unit of the internal combustion engine or, as an alternative, the determination can also be made by means of an appropriate measuring device. By determining the loading state in each ring, it can be ascertained whether local soot accumulations have occurred. In this context, it is especially preferred if the regeneration of the particulate filter according to the invention is initiated when a threshold value of the permissible loading is exceeded in the radially outer ring. Here, the exhaust gas temperature only has to be raised accordingly if a local soot accumulation is detected in the outer edge zone. Otherwise, a regeneration of the particulate filter can be carried out by raising the temperature to a lesser extent, as a result of a shorter heating phase is possible and fuel can be saved.

According to another preferred embodiment of the method, it is provided that the temperature of the particulate filter is only raised from a first threshold temperature to a second threshold temperature if a non-uniform loading of the particulate filter is detected. Here, the first threshold temperature is at a level at which a regeneration of the particulate filter is possible but not guaranteed under all operating conditions. The second threshold temperature is above the first threshold temperature and permits a complete regeneration of all zones of the particulate filter under all operating conditions, so that even more strongly cooled edge zones of the particulate filter reach the regeneration temperature needed for oxidizing the soot. Otherwise, a regeneration can be carried out at a lower temperature, as a result of which the heating phases can be shortened, thus saving fuel.

In another advantageous embodiment of the invention, it is provided that the loading of each ring is determined by a calculation model relating to the particles entering the particulate filter and the particles exiting from a given ring of the particulate filter. An appropriate calculation model can be used to determine a non-uniform distribution of the soot retained in the particulate filter without the need for additional hardware components, so that there are no additional components that would increase the flow resistance in the exhaust gas channel. Even if such an adaptation of the calculation model entails (one-time) additional programming work, it is likely that—at the production volumes normally encountered in automotive construction—such a solution would also be more favorable than a solution involving additional components for measuring the loading state.

According to another improvement of the method, it is provided that measures to protect the components of the particulate filter are initiated when an unfavorable loading state of the particulate filter is detected. In order to avoid thermal damage to the particulate filter in case of a critical loading and the resultant unfavorable operating conditions of the internal combustion engine, the air-fuel ratio can be adapted if such an unfavorable loading state is detected, and can be shifted especially in the substoichiometric direction. As an alternative or in addition, the overrun phases that occur during such a loading state can be avoided or interrupted in order to prevent the simultaneous presence of high temperatures and an excess of oxygen in the exhaust gas channel.

The invention proposes an internal combustion engine having an exhaust gas channel and a particulate filter arranged in the exhaust gas channel of the internal combustion engine and having a control unit that has a computer-readable program algorithm for carrying out a method according to the invention as well as conceivably necessary characteristic maps and the like. An appropriate control unit can be used to easily control or regulate the internal combustion engine in such a way that a complete regeneration of the particulate filter is achieved and damage to the components of the particulate filter, especially thermal damage to the particulate filter, can be avoided.

In a preferred embodiment of the invention, it is provided that a sensor system for determining the loading state in the various zones of the particulate filter is arranged on or in the exhaust gas channel. An appropriate sensor system can determine the loading state of the particulate filter in a manner that is differentiated according to zones, so that the loading states and the distribution of the soot particles on the particulate filter can be ascertained. Thus, especially when soot particles have accumulated in an edge zone of the particulate filter, the temperature can be raised to such an extent that the temperature needed for oxidizing the retained soot particles is reached.

In this context, it is particularly preferred for the sensor system to have a radio frequency sensor system. Radio frequency technology can be used to determine the soot loading of the particulate filter in several zones. In this process, a radio frequency sensor is much less prone to malfunction than an optical sensor that gets dirty from the generated soot and that consequently has to be regularly cleaned.

In another advantageous refinement, it is provided for the internal combustion engine to be an externally ignited internal combustion engine that works according to the Otto principle. Whereas a diesel engine is operated with an superstoichiometric air-fuel ratio in almost all operating points and the oxygen needed for regenerating the particulate filter is virtually always present, the regeneration of a gasoline engine is much more complex since gasoline engines are typically operated at a stoichiometric air-fuel ratio and the oxygen needed for regenerating the particulate filter is only available during overrun phases or by systematically controlling the injected fuel quantity.

Unless otherwise indicated in an individual case, the various embodiments of the invention put forward in this application can be advantageously combined with each other.

BRIEF DESCRIPTION OF THE DRAWINGS

The invention will be explained below in embodiments with reference to the accompanying drawings. The following is shown:

FIG. 1 shows an internal combustion engine 10 having an exhaust gas channel 12 and a particulate filter 20 arranged in the exhaust gas channel 12. The internal combustion engine 10 is preferably configured as an internal combustion engine to power a motor vehicle, especially preferably as a gasoline engine. The internal combustion engine 10 preferably has direct fuel injection by means of which the fuel is injected directly into the cylinders of the internal combustion engine 10. The combustion processes in the internal combustion engine 10 are controlled or regulated by means of a control unit 16. The internal combustion engine 10 is preferably configured as a turbocharged internal combustion engine that is supplied with air by means of a turbocharger 14 or a compressor. As an alternative, the internal combustion engine 10 can also be configured as a naturally aspirated engine or as an internal combustion engine 10 of some other type. A three-way catalytic converter 18 is preferably arranged in the exhaust gas channel 12 of the internal combustion engine 10.

DETAILED DESCRIPTION OF THE INVENTION

Figure 1:
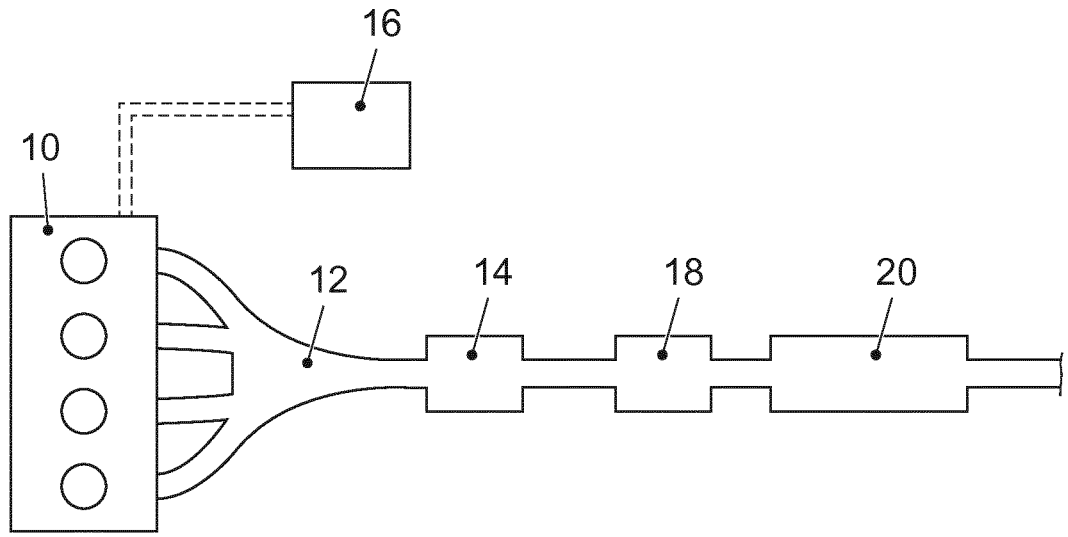
FIG. 1 an internal combustion engine having an exhaust gas channel and a particulate filter in which a method according to the invention for regenerating the particulate filter can be carried out, FIG. 2 a section through a particulate filter with which a method according to the invention is carried out, FIG. 3 a particulate filter in the exhaust gas channel of an internal combustion engine which is non-uniformly loaded with soot particles, and also showing an associated temperature profile over the cross section of the particulate filter, and FIG. 4 another particulate filter in the exhaust gas channel of an internal combustion engine in which the temperature was raised by a method according to the invention to such an extent that the temperature needed for the regeneration is reached in all of the zones of the particulate filter, and also showing an associated temperature profile over the cross section of the particulate filter.

During the operation of the internal combustion engine 10, the particulate filter 20 is loaded with particles from the combustion process of the internal combustion engine 10. This loading can be determined by means of modeling in the control unit 16 or else by means of a measurement, especially a differential measurement, over the particulate filter 20. In order to prevent the exhaust gas counter-pressure of the internal combustion engine 10 from rising excessively, the particulate filter 20 has to be continuously or periodically regenerated. The particulate filter 20 can also have a catalytically active coating, for example, a three-way catalytically active coating. In order to use oxygen to carry out a thermal oxidation of the soot particles retained in the particulate filter 20, a sufficient temperature level is needed, along with the concurrent presence of residual oxygen in the exhaust gas. The soot discharge from the particulate filter 20 can likewise be determined by means of modeling in the control unit 16. As an alternative, the loading state of the particulate filter 20 can also be measured by an appropriate sensor system 28, for example, by a sensor system 30 that emits radio waves.

Figure 2:
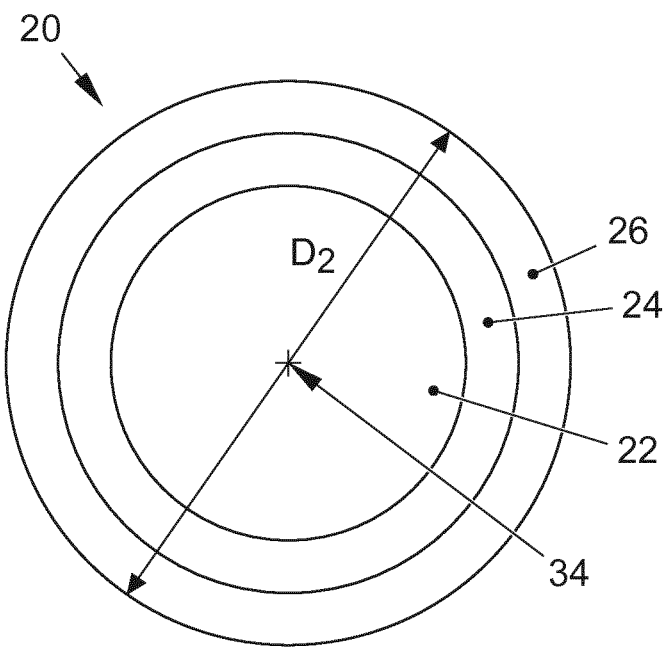

FIG. 2 shows a cross section through the body 36 of the particulate filter 20. As already mentioned, the decisive factors for regenerating the particles retained in the particulate filter 20 are an excess of oxygen and a sufficient temperature of the exhaust gas flowing through the particulate filter 20. Owing to the construction of the particulate filter 20, the temperature is necessarily distributed radially throughout the particulate filter 20 during operation, whereby the inner zone 22 facing the center axis 34 has a higher temperature than the edge zone 26. The zones 22, 24, 26 are arranged as concentric rings around the center axis 34 of the particulate filter 20. Owing to the heat losses through the wall of the particulate filter 20 and owing to a slower flow rate of the hot gas, the temperature decreases towards the wall of the particulate filter 20. The extent of this temperature drop is decisively influenced by the operating point and by the structural design of the opening funnel 38 and by the characteristic of the inflow against the body 36 of the particulate filter 20. In the edge areas, especially in the third zone 26, this temperature gradient can mean that the temperature prevailing there is no longer sufficient for an oxidation of the soot. As a result, there are zones 26 of the particulate filter 20 in which soot continues to accumulate while other hotter zones 22 are regularly regenerated. This leads to problems with the regenerability as well as with the counter-pressure behavior of the particulate filter 20. Moreover, an uncontrolled regeneration of the particulate filter 20 can cause the particulate filter 20 to be thermally damaged. This can especially be the case if an operating point is actuated at which a changeover is made from very high exhaust gas temperatures to overrun operation during numerous short-distance trips and the resultant soot accumulation in the particulate filter 20.

In the method according to the invention, the regeneration temperature of the particulate filter 20 is regulated on the basis of the soot distribution in zones 22, 24, 26 of the body 36 of the particulate filter 20. If a non-uniform soot distribution is detected in the individual zones 22, 24, 26, then the regeneration temperature $T_{reg}$ is raised by the engine management system to such an extent that the temperature needed for regenerating the soot is also reached in the edge zone 26.

Figure 3:
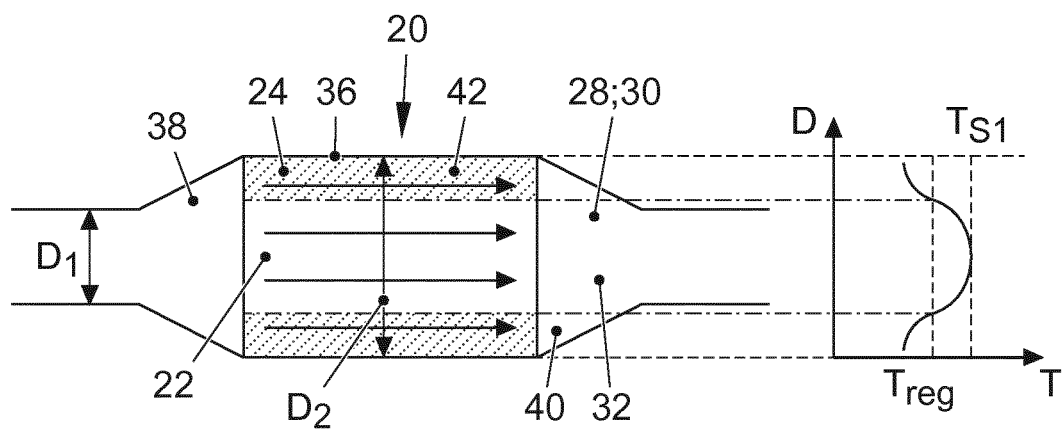

FIG. 3 shows a particulate filter 20 of the type often used nowadays in motor vehicles with internal combustion engines 10. The particulate filter 20 has an opening funnel 38, a body 36 as well as a collecting funnel 40, whereby the diameter $D_2$ of the body 36 provided with the filter material 42 is larger than the diameter $D_1$ of the exhaust gas channel 12 upstream as well as downstream from the particulate filter 20. Along the center axis 34, there is a first concentric zone 22 that is hotter than a second zone 24 in the edge area of the particulate filter 20. The temperature distribution over the diameter $D_2$ of the filter body 36 is shown in FIG. 3. Here, it can be seen that the temperature needed for oxidizing the soot is not reached in the second zone 24, whereas the temperature T in the first zone is raised to a first threshold temperature $T_{S1}$ that lies above the regeneration temperature $T_{reg}$. Here, owing to the generally known fluid-dynamic and thermodynamic laws, a higher flow rate and a lower heat loss occur in the first zone 22, whereas the flow is slower through the outer zone 24, in addition to which the outer zone 24 also has a higher heat loss through the outer wall of the particulate filter 20. As shown in FIG. 3, this can cause soot to accumulate in the outer zone 24, whereas a partial regeneration of the particulate filter 20 takes place in the inner zone 22. In this process, a soot ring is deposited in the outer zone 24 that can only be regenerated by raising the exhaust gas temperature. Here, it has to be ensured that the outer areas 24, 26 of the particulate filter are also above the regeneration temperature $T_{reg}$ of the particulate filter 20. If a higher load point with a very high exhaust gas temperature is implemented with such a soot ring, then component-damaging situations can occur in the particulate filter 20. This is possible, for example, if numerous city-traffic trips are followed by highway driving at full load, which is then followed by an overrun phase, during which large amounts of fresh air enter the exhaust gas channel 12 and thus the particulate filter 20.

In order to determine the loading state of the particulate filter 20, an appropriate sensor system 28, especially a radio frequency sensor system 30, can be provided on the particulate filter 20 in order to determine the loading states of the individual zones of the particulate filter 20. As an alternative, this can also be carried out by a loading model stored in the control unit 16. Furthermore, at least one temperature sensor 32 is arranged in the collecting funnel 40 in order to determine the exhaust gas temperature downstream from the particulate filter 20 and to model a temperature distribution over the cross section of the particulate filter 20 on the basis of the determined temperature(s). As an alternative, the exhaust gas temperature can also be modeled by the appertaining parameters of the internal combustion engine 10 and by a corresponding calculation model stored in the control unit 16.

Figure 4:
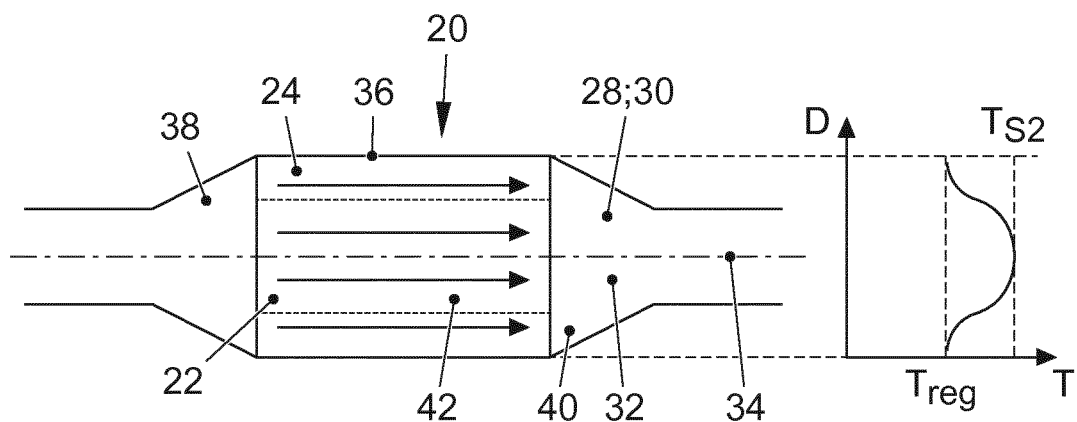

According to the invention, the regeneration of the particulate filter now takes place as shown in FIG. 4. If a non-homogenous soot distribution is detected over zones 22, 24, 26 of the particulate filter 20, then the engine management system stored in the control unit 16 requests an elevated exhaust gas temperature $T_{S2}$ that is selected in such a way that—for the current operating state of the particulate filter 20, that is to say, for the exhaust gas mass flow through the particulate filter 20 as well as for the soot loading—the temperature is also so high in the outer zones 24, 26 that the soot retained there can be oxidized. Once the regeneration of the particulate filter 20 has been completed in the outer zones 24, 26, which is ascertained by the sensor system 28 or by an appropriate loading model, the regeneration of the particulate filter 20 is terminated. This ensures a homogenous distribution of the subsequent soot loading.

In this manner, it is ensured that each active regeneration of the particulate filter 20 is always only carried out at the required exhaust gas temperature $T_{S1}$, $T_{S2}$, thereby saving fuel. The target regeneration temperature of the particulate filter 20 can be variably influenced as a function of the loading states and of the operating point. This method can prevent that the particulate filter 20 is constantly, that is to say, during every single regeneration process, regenerated at an elevated regeneration temperature $T_{S2}$, but rather that this only occurs when a given loading of the outer zones 24, 26 makes this necessary.

LIST OF REFERENCE NUMERALS 10 internal combustion engine
12 exhaust gas channel
14 turbocharger
16 control unit
18 three-way catalytic converter
20 particulate filter
22 first zone/first ring
24 second zone/second ring
26 third zone/third ring
28 sensor system
30 radio frequency sensor
32 temperature sensor
34 center axis
36 body of the particulate filter
38 opening funnel
40 collecting funnel
42 filter material
$D_1$ diameter of the exhaust gas channel
$D_2$ diameter of the particulate filter
T temperature
$T_{S1}$ first threshold temperature
$T_{S2}$ second threshold temperature
$T_{reg}$ regeneration temperature

The invention claimed is:

1. A method for regenerating a particulate filter in an exhaust gas channel of a spark-ignited internal combustion engine according to the Otto principle, said method comprising the following steps:
    determining a loading state of the particulate filter by means of a loading model or by means of a sensor system,
    dividing the particulate filter into at least two zones for purposes of creating the loading model,
    determining a loading state and/or a temperature separately for each zone of the particulate filter, and
    when it is detected that there is a need for regenerating at least one zone of the at least two zones of the particulate filter, raising the temperature to such an extent that the temperature in all of the at least two zones of the particulate filter is above a regeneration temperature needed for oxidizing the soot that has been retained in the particulate filter, and
    wherein measures to protect components of the particulate filter are initiated when an unfavorable loading state of the particulate filter is detected, wherein, in an event of critical loading of the particulate filter, a combustion air ratio is shifted in a direction of sub-stoichiometric or overrun phases of the internal combustion engine are avoided or interrupted in order to avoid a simultaneous presence of high temperatures and excess oxygen in the exhaust gas channel.

2. The method according to claim 1, wherein dividing the particulate filter further comprises dividing a cross section of the particulate filter into at least two rings in a radial direction, and
wherein each of said at least two rings forming one of the at least two zones whose loading condition and/or temperature is separately monitored or modeled.

3. The method according to claim 2, wherein determining a loading state and/or a temperature separately for each zone further comprises determining a loading state for each of the at least two rings.

4. The method according to claim 3, wherein regeneration of the particulate filter is initiated when a threshold value of the loading state is exceeded in a radially outermost ring of the at least two rings.

5. The method according to claim 2, wherein the loading state of each of the at least two rings is determined by a calculation model relating to particles entering the particulate filter and particles exiting from an appertaining ring of the at least two rings.

6. The method according to claim 1, wherein the temperature of the particulate filter is raised from a first threshold temperature to a second threshold temperature only if a non-uniform loading of the particulate filter is detected.

7. An internal combustion engine having:
an exhaust gas channel,
a particulate filter arranged in the exhaust gas channel of the internal combustion engine, and
a control unit that has a non-transitory computer-readable program algorithm for carrying out the method according to claim 1.

8. The internal combustion engine according to claim 7, further comprising the sensor system for determining the loading state in the at least two zones of the particulate filter, wherein the sensor system is arranged on or in the exhaust gas channel.

9. The internal combustion engine according to claim 8, wherein the sensor system comprises a radio frequency sensor system.

* * * * *